(12) United States Patent
Powell (10) Patent No.: US 9,517,596 B2
(45) Date of Patent: Dec. 13, 2016

(54) GROUND CONTAINMENT LINERS

(75) Inventor: Beth P. Powell, State College, PA (US)

(73) Assignee: New Pig Corporation, Tipton, PA (US)

(*) Notice: Subject to any disclaimer, the term of this patent is extended or adjusted under 35 U.S.C. 154(b) by 0 days.

(21) Appl. No.: 13/404,992

(22) Filed: Feb. 24, 2012

(65) Prior Publication Data

US 2012/0219746 A1  Aug. 30, 2012

Related U.S. Application Data

(60) Provisional application No. 61/446,247, filed on Feb. 24, 2011, provisional application No. 61/555,523, filed on Nov. 4, 2011.

(51) Int. Cl.
| | |
|---|---|
| *B32B 27/12* | (2006.01) |
| *B29D 7/01* | (2006.01) |
| *B32B 5/02* | (2006.01) |
| *B32B 27/32* | (2006.01) |
| *B09B 1/00* | (2006.01) |

(52) U.S. Cl.
CPC ............... *B29D 7/01* (2013.01); *B09B 1/004* (2013.01); *B32B 5/022* (2013.01); *B32B 5/024* (2013.01); *B32B 27/12* (2013.01); *B32B 27/32* (2013.01); *B32B 2260/021* (2013.01); *B32B 2260/023* (2013.01); *B32B 2260/046* (2013.01); *B32B 2262/0253* (2013.01); *B32B 2262/0261* (2013.01); *B32B 2262/0269* (2013.01); *B32B 2262/0276* (2013.01); *B32B 2262/04* (2013.01); *B32B 2262/06* (2013.01); *B32B 2262/08* (2013.01); *B32B 2571/00* (2013.01); *Y02W 30/32* (2015.05); *Y10T 428/19* (2015.01); *Y10T 428/2495* (2015.01); *Y10T 428/24967* (2015.01); *Y10T 428/249921* (2015.04); *Y10T 442/10* (2015.04); *Y10T 442/2025* (2015.04); *Y10T 442/3496* (2015.04); *Y10T 442/365* (2015.04); *Y10T 442/659* (2015.04); *Y10T 442/667* (2015.04); *Y10T 442/671* (2015.04)

(58) Field of Classification Search
CPC .......... B32B 5/022; B32B 27/12; B32B 27/32; B32B 5/024; B32B 2260/021; B32B 2260/023; B32B 2260/046; B29D 7/01; Y10T 428/2495; Y10T 428/24967; Y10T 428/19; Y10T 428/249921; Y10T 442/2025; Y10T 442/3496; Y10T 442/659
USPC .................... 442/85, 86, 104, 164, 381, 392
See application file for complete search history.

(56) References Cited

U.S. PATENT DOCUMENTS

| | | | | |
|---|---|---|---|---|
| 3,646,651 | A | * | 3/1972 | McGaughey et al. .......... 492/52 |
| 4,173,199 | A | * | 11/1979 | Fassina ......................... 118/212 |
| 4,230,753 | A | | 10/1980 | Sheyon |
| 4,609,580 | A | | 9/1986 | Rockett et al. |

(Continued)

FOREIGN PATENT DOCUMENTS

| | | |
|---|---|---|
| DE | 202004019761 U1 | 5/2006 |
| DE | 102007017410 A1 | 10/2008 |

(Continued)

*Primary Examiner* — Jeremy R Pierce
(74) *Attorney, Agent, or Firm* — Alan G. Towner, Esq.; Pietragallo Gordon Alfano Bosick & Raspanti, LLP (57) ABSTRACT

The present invention provides containment liners to protect the environment from spills and leaks at oil and/or gas production sites and other sites. The containment liner comprises a first felt geotextile layer and a polymeric barrier layer embedded partially into the felt geotextile layer.

25 Claims, 7 Drawing Sheets

(56) References Cited

U.S. PATENT DOCUMENTS

| | | | |
|---|---|---|---|
| 4,696,599 A * | 9/1987 | Rakoczynski et al. | 405/129.7 |
| 4,765,775 A | 8/1988 | Kroger | |
| 5,056,960 A | 10/1991 | Marienfeld | |
| 5,137,393 A | 8/1992 | Fuhr et al. | |
| 5,320,698 A | 6/1994 | Fournier et al. | |
| 5,507,900 A | 4/1996 | Mohammed et al. | |
| 5,736,237 A * | 4/1998 | Rhee et al. | 428/220 |
| 5,747,134 A | 5/1998 | Mohammed et al. | |
| 6,530,722 B1 | 3/2003 | Shaw et al. | |
| 6,623,214 B1 * | 9/2003 | Hauske et al. | 428/63 |
| 7,950,075 B2 | 5/2011 | Evans, Jr. et al. | |
| 8,117,686 B2 | 2/2012 | Powell et al. | |
| 8,168,853 B2 | 5/2012 | Autran et al. | |
| 2002/0168531 A1 * | 11/2002 | Markusch et al. | 428/423.1 |
| 2003/0045192 A1 * | 3/2003 | Midkiff et al. | 442/381 |
| 2004/0157074 A1 | 8/2004 | Hubbard | |
| 2004/0237180 A1 | 12/2004 | Evans, Jr. et al. | |
| 2005/0009425 A1 | 1/2005 | Foote | |
| 2005/0058838 A1 * | 3/2005 | Markusch et al. | 428/423.1 |
| 2005/0170143 A1 | 8/2005 | Yau | |
| 2005/0262624 A1 | 12/2005 | Evans, Jr. et al. | |
| 2007/0033722 A1 | 2/2007 | Evans, Jr. et al. | |
| 2011/0318548 A1 | 12/2011 | Fedeli et al. | |
| 2013/0185856 A1 | 7/2013 | Powell et al. | |

FOREIGN PATENT DOCUMENTS

| | | | | |
|---|---|---|---|---|
| GB | 2356880 A * | 6/2001 | | E01B 1/00 |
| WO | 2007103709 A1 | 9/2007 | | |

* cited by examiner

GROUND CONTAINMENT LINERS

CROSS-REFERENCE TO RELATED APPLICATION

This application claims the benefit of U.S. Provisional Patent Application Ser. No. 61/446,247 filed Feb. 24, 2011, and U.S. Provisional Patent Application Ser. No. 61/555,523 filed Nov. 4, 2011, both of which are incorporated herein by reference.

FIELD OF THE INVENTION

The present invention relates to ground liners useful for the containment of waste water and other potential contaminants at oil and gas well sites, and other locations.

BACKGROUND INFORMATION

Efforts have been made to contain various types of contaminants at oil and gas well sites. For example, at non-conventional shale gas drilling sites, there are large quantities of fuel, drilling mud, fracturing chemicals, corrosives and flowback water. Spills of any of these liquids must be reported to regulatory agencies, and the contaminated soil and water must be remediated. To reduce the amount of contaminated soil and water and to eliminate regulatory fines, many operating companies excavate the site, cover it with stone or crushed rock, place a geotextile over the crushed rock, and then loosely place a geomembrane over the surface. For non-conventional shale gas drilling sites, the preferred geotextile is an 8 to 10 oz/yd$^2$ needlepunched polypropylene felt and the geomembrane is a 20 to 60 mil thick high density polyethylene (HDPE). The geotextile protects the geomembrane from sharp edges in the stone or crushed rock base. The felt is either sewn or heat tacked together with a hot air tool. The geomembrane is then placed over the geotextile and welded together with a hot wedge welder, a hot air tool or an extrusion fillet welder.

Once the layers are installed at the well site, the geomembrane is pulled over earthen berms, railroad ties or corrugated pipe to form containment walls around the perimeter. The geomembrane then contains the leaks and spills for subsequent removal, e.g., until an on-site vacuum truck can remove them without impact to the environment.

There are issues with the current configurations. Traditional HDPE geomembranes for ponds and pits were not designed for foot and vehicle traffic. HPDE geomembranes are prone to punctures, e.g., from dropped hoses, vehicles and equipment movement. The geomembranes are also extremely slippery to work on, even with a textured surface. Friction treatment of geomembrane or geotextile surfaces to prevent slippage is disclosed in U.S. Pat. Nos. 5,056,960 and 5,137,393, respectively.

To increase traction in standing water, snow and ice, some operating companies now place, but do not bond, an additional layer of a geotextile over the HDPE geomembrane to reduce slip hazards. For example, an 8 to 10 oz/yd$^2$ needlepunched polypropylene felt may be used for this purpose. While the geotextile improves traction on the top walking surface, it has disadvantages. The geotextile slides around on the geomembrane, producing a slip hazard. Geotextiles can bunch and can be pulled into vacuum hoses while removing liquids from the surface. Geotextiles can also absorb a considerable amount of fluid that then can freeze, negating any increased traction. Loose geotextiles can mask punctures in the geomembrane beneath it, which may only be discovered after a spill or leak. Furthermore, the geotextiles complicate the installation of grounding rods through the geomembrane, since the geotextiles need to be cut away so the geomembrane can be sealed to the grounding rod.

A polymer sheet that has geotextiles laminated on both sides is disclosed in U.S. Pat. No. 5,747,134 for use in ponds, landfills and hazardous and non-hazardous waste disposal. The covers and barriers are designed to provide primary containment, but not to withstand foot and/or vehicle traffic. Because this laminate is not subject to abrasion and/or shear forces, the three separate continuous layers can be joined together by tie layers or with adhesive. While this laminate protects the geomembrane from punctures on both sides, tie layers and adhesives are not adequate to prevent delamination under heavy vehicle traffic, such as cranes, frac tanks and track hoes at gas drilling pads. Once delaminated, the layers can move around and result in the same issues as the loose laid geotextiles. The continuous polymer sheet also leads to thick, stepped seams, which can be a tripping hazard.

The present invention has been developed in view of the foregoing.

SUMMARY OF THE INVENTION

The present invention provides containment liners to protect the environment from spills and leaks, for example, at oil and/or gas production sites such as drilling sites and surrounding areas.

An aspect of the present invention is to provide a containment liner comprising a first felt geotextile layer, a second felt geotextile layer covering at least a portion of the first felt geotextile layer, and at least one polymeric barrier layer between the first and second felt geotextile layers, wherein the at least one polymeric barrier layer is embedded into at least one of the first and second felt geotextile layers.

Another aspect of the present invention is to provide a containment liner comprising a felt geotextile layer, and a polymeric barrier layer embedded into the felt geotextile layer, wherein the felt geotextile layer comprises a heat treated surface on a side of the felt geotextile layer opposite from the polymeric barrier layer.

A further aspect of the present invention is to provide a method of making a containment liner comprising providing at least one felt geotextile layer, and extruding a polymeric barrier layer material adjacent to the at least one felt geotextile layer to thereby embed at least a portion of the polymeric barrier layer material into the at least one felt geotextile layer.

These and other aspects of the present invention will be more apparent from the following description.

DETAILED DESCRIPTION

An embodiment of the present invention provides a containment liner that provides an all-weather work surface for various sites. The containment liner may comprise an integrated composite including at least one polymeric barrier layer embedded into and between outer layers of a puncture-resistant felt base, and a slip-resistant work surface felt that is also resistant to puncture and abrasion. In accordance with the present invention, the term "embedded", when referring to the polymeric barrier layers, means that at least a portion of the polymeric material of the barrier layer flows into and impregnates the adjacent felt layer such that voids between the felt fibers are at least partially filled with the polyemic barrier material. In certain embodiments, one of the longitudinal edges of the containment liner composite is not covered by the base felt layer and the opposite longitudinal edge is not covered by the surface felt layer in order to form felt-free offsets for thermal joining of contiguous sections of the composite liners.

FIGS. 1-6 schematically illustrate containment liners in accordance with embodiments of the present invention. In the embodiment shown in FIG. 1, a containment liner 1 includes two felt geotextile layers 10, each of which comprises an interior felt material section 11, a heat treated outer surface 12 and an impregnated region 13 comprising polymeric barrier layer material embedded in the felt material. The containment liner 1 comprises two polymeric barrier layers 15. A portion of each polymeric barrier layer 15 is embedded in an adjacent felt geotextile layer 10 to form a region 14 comprising the embedded portion 13 of the polymeric barrier layer material and a non-embedded portion 15 of the polymer barrier layer material. The felt geotextile layers 10 are offset with respect to each other to form a seam bonding surface 20 comprising exposed surfaces of the polymer barrier layers 15.

Figure 1:
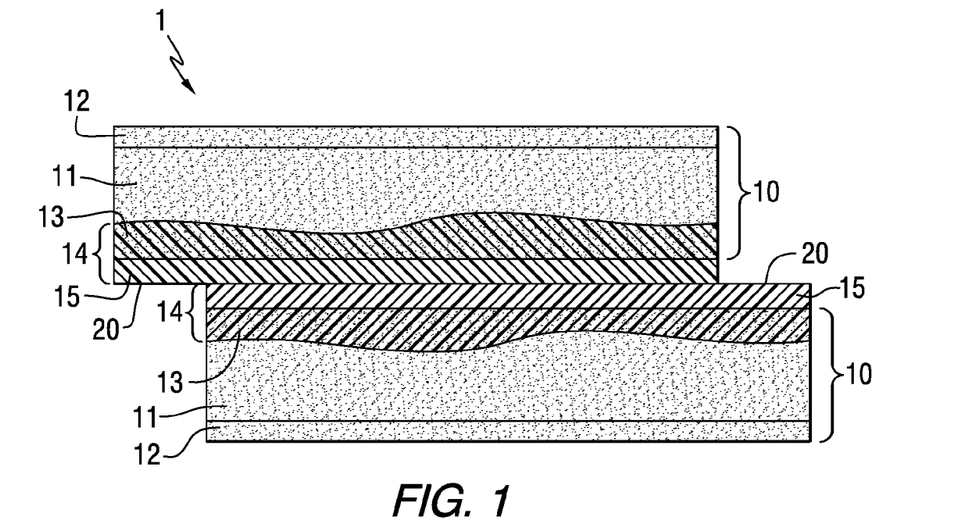
FIG. 1 is a partially schematic side sectional view of a containment liner in accordance with an embodiment of the present invention.
Figure 2:
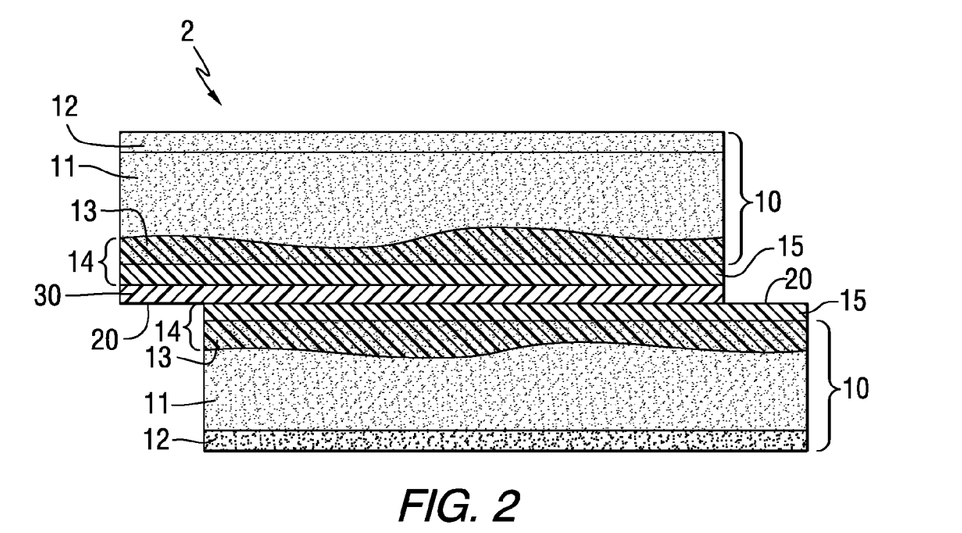
FIG. 2 is a partially schematic side sectional view of a containment liner in accordance with another embodiment of the present invention.

In the embodiment shown in FIG. 2, the containment liner 2 is similar to the embodiment shown in FIG. 1, with the addition of an intermediate layer 30 positioned between the embedded regions 14 of the felt geotextile layers 10. In the embodiment shown in FIG. 2, one of the offset edges 20 comprises an exposed surface of the polymeric barrier layer 15, while the other offset edge 20 comprises an exposed surface of the intermediate layer 30.

Figure 3:
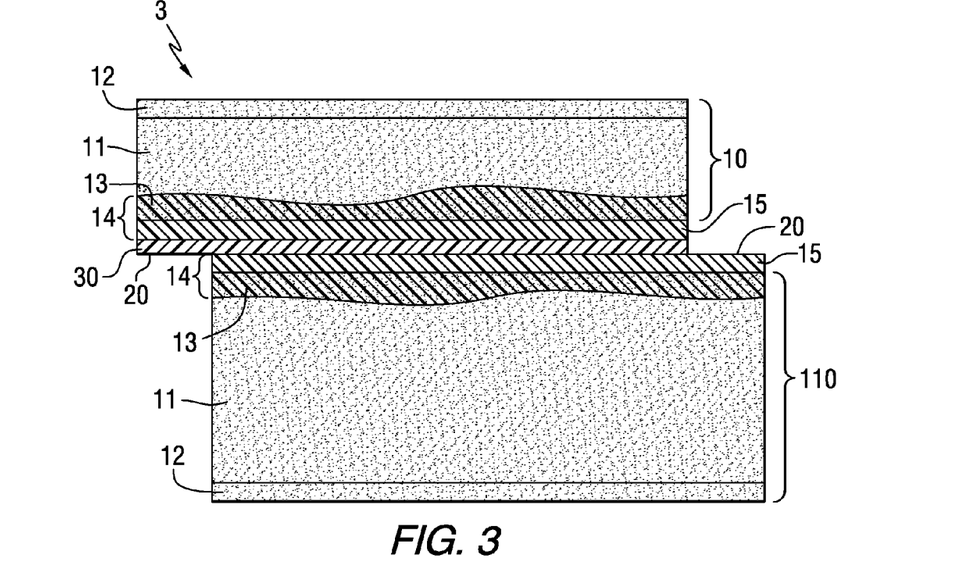
FIG. 3 is a partially schematic side sectional view of a containment liner in accordance with a further embodiment of the present invention.

In the embodiment shown in FIG. 3, the containment liner 3 is similar to the embodiment shown in FIG. 2, except the lower felt geotextile layer 110 is of greater thickness than the upper felt geotextile layer 10.

Figure 4:
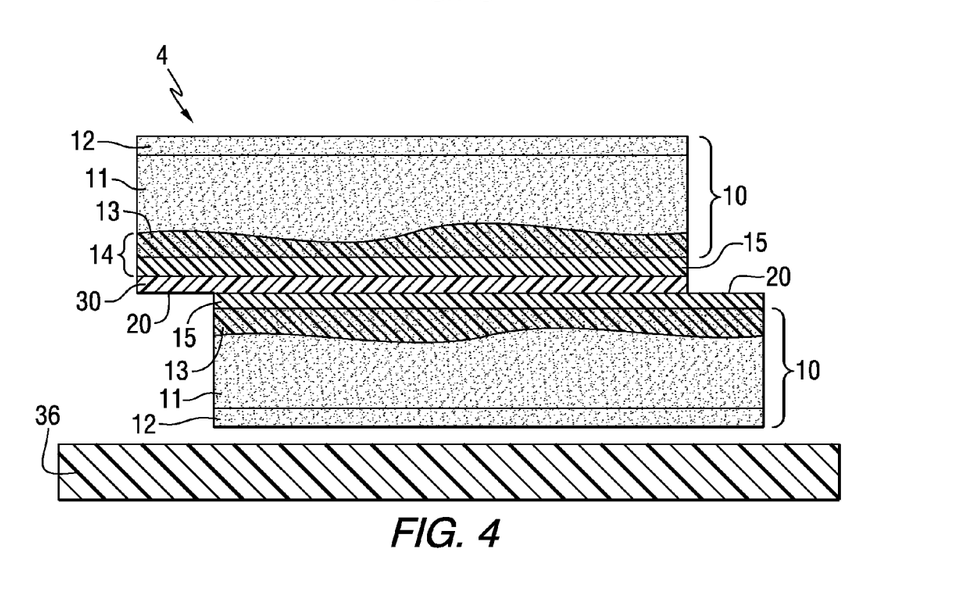
FIG. 4 is a partially schematic side sectional view of a containment liner in accordance with another embodiment of the present invention.

In the embodiment shown in FIG. 4, the containment liner 4 is similar to the embodiment shown in FIG. 2, with the addition of a separate loose laid puncture-resistant layer 36 below the containment liner 4. The puncture-resistant layer 36 may be any suitable material such as a needlepunched material that may be placed over an aggregate base (not shown) prior to installation of the containment liner 4.

Figure 5:
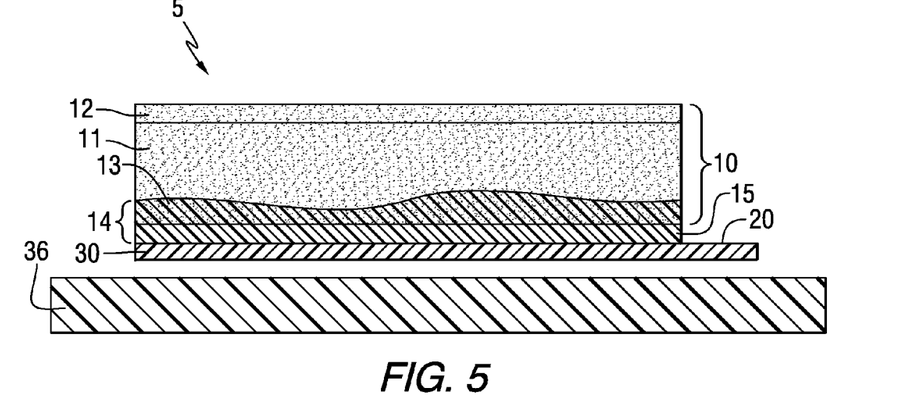
FIG. 5 is a partially schematic side sectional view of a containmnent liner in accordance with a further embodiment of the present invention.

In the embodiment shown in FIG. 5, the containment liner 5 comprises a single felt geotextile layer 10 and single polymeric barrier layer is secured to an intermediate layer 30. In this embodiment, the containment liner 5 may be installed over a loose laid puncture-resistant layer 36.

Figure 6:
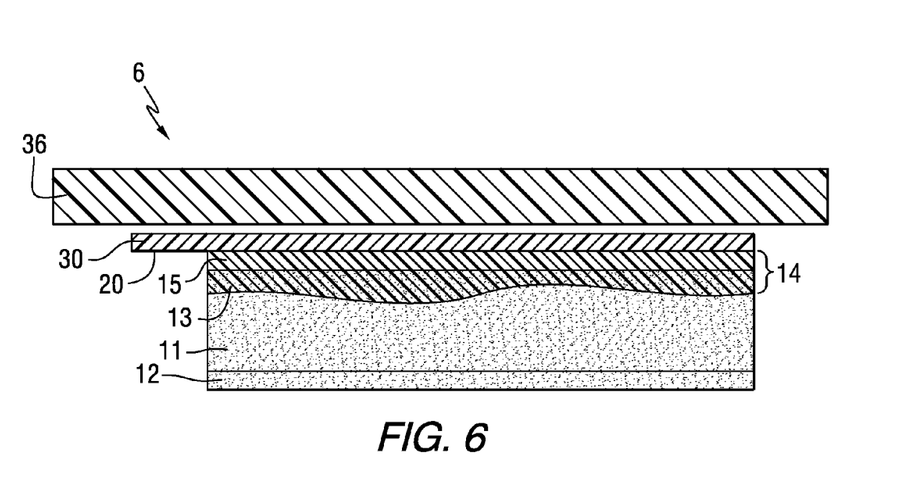
FIG. 6 is a partially schematic side sectional view of a containment liner in accordance with another embodiment of the present invention.

In the embodiment shown in FIG. 6, the containment liner 6 comprises a single felt geotextile layer 10 and a single polymeric barrier layer 15 is secured to an intermediate layer 30. In this embodiment, the containment liner 6 may be installed in a desired area first, followed by installation of the separate puncture-resistant layer 36.

The felt layers 11 may comprise fibers such as natural fibers, e.g., wool, hemp, coconut and jute, or synthetic fibers, e.g., polyester, polypropylene, nylon, rayon, polytetrafluoroethylene (Teflon), aromatic polyamide aramid (Nomex) and poly para-phenyleneterephthalamide (Kevlar). The felt layers 11 may also comprise a blend of such natural and synthetic fibers. The felts layers 11 may be produced by pressed, needled, fleeced, and other nonwoven and woven techniques. Woven reinforced felts may be used. The fibers of the felt may be bonded together by various types of polymeric resins. A preferred material is needlepunched felt because of its abrasion and puncture resistance. In certain embodiments, the felt may be treated with an antistatic agent and/or may contain conductive fibers to reduce the risk of a spark in flammable environments.

In certain embodiments, a surface of each felt layer 11 may be heat treated to provide the heat treated outer surfaces 12 illustrated in FIGS. 1-6. Heat treatment may be accomplished by infrared radiation, hot calendaring or any other suitable heat source. Typical temperature ranges for the heat treatment are from 110 to 175° C. The felt layers 11 may have a low-heat set side and a high-heat set side, or, as with the natural fibers, may be surface stabilized with an adhesive. The low-heat set side provides bonding depth and an entanglement area for the adjacent polymeric barrier layer. The high-heat set side provides an improved abrasion-resistant surface to protect the entanglement area. This reduces the amount of scuffing and pilling during use.

The use of polymeric barrier layers 15 embedded in felt layers 11 in accordance with the present invention avoids problems associated with conventional bonded layers. Adhesives tend to have limited tolerance to low and high temperatures, as well as compatibility with hydrocarbons and corrosives that may be present at drilling, fracturing and completion sites. This leads to delamination in the field under shear forces. Tie layers, which adhere dissimilar materials together, are typically 0.2 mil to 1 mil thick. This results in limited surface contact with the felt, yielding low mechanical interlock, which leads to delamination in the field under shear forces. The embedded barrier layers of the present invention eliminate the need for adhesives or tie layers.

The embedded polymeric barrier layers 15 of the present invention may comprise hydrocarbon and acid-resistant extruded plastic resins, such as polypropylene (PP), thermoplastic olefins (TPOs), linear low-density polyethylene (LLDPE), low-density polyethylene (LDPE), medium-density polyethylene (MDPE), high-density polyethylene (HDPE), polyethylene terephthalate (PET), polybutylene terephthalate (PBT), polyvinyl chloride (PVC), nylon, polystyrene, polyurethane, ethylene vinyl acetate (EVA), styrene block copolymers (SBC) such as styrene-isoprene-styrene (SIS), styrene-isobutylene-styrene (SIBS), styrene isoprene polymer (SIP), styrene-butadiene-styrene (SBS) and the like.

Figures 7, 7A:
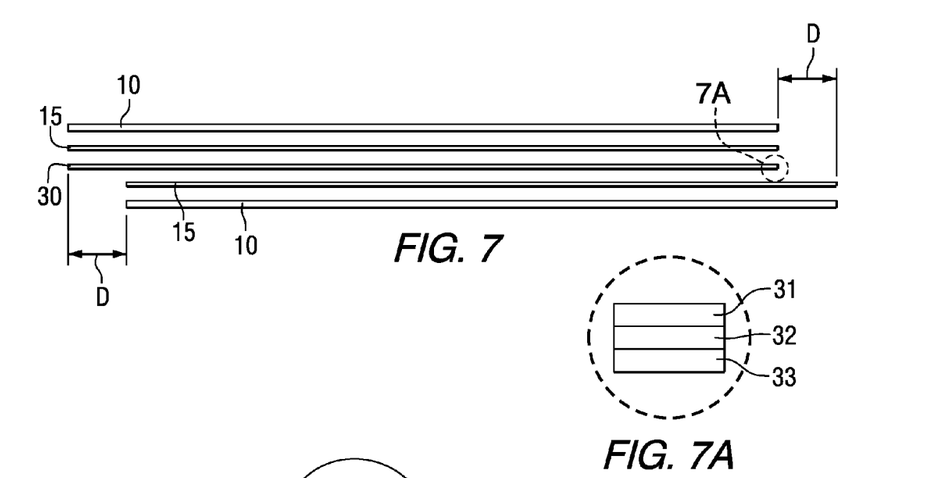
FIG. 7 is a partially schematic exploded side view illustrating various layers of a containment liner in accordance with an embodiment of the present invention.
FIG. 7A is an enlarged view of a portion of one of the layers shown in FIG. 7.

The intermediate layers 30 as shown in FIGS. 2-6 may comprise similar polymeric layers as the polymeric barrier layers 15. In certain embodiments as shown in FIGS. 7 and 7A, the intermediate layer 30 may comprise multiple layers 31, 32 and 33, which may be the same or different from each other. In one embodiment, the upper layer 31 may be a thermoplastic polyolefin, while the middle layer 32 and lower layer 33 may be polypropylene. At least one of the layers 31, 32 and 33 may comprise reinforcements, such as fibers, strings, scrim cloth or the like.

In accordance with embodiments of the present invention, polymeric barrier layer resins are extruded directly into a side of the felt, for example, a low-heat set side of the felt. This provides an embedded mechanical interlock and eliminates the need for adhesives. In certain embodiments, the extruded resin barrier layers 15 may be at least 2 or 3 mils thick and can be as thick as 30, 60 or 100 mils or more. The barrier layers 15 extend into the adjacent felt layers 11 a distance of at least 1 or 2 mils, typically at least 3 mils. Thus, the embedded portion 13 of the polymeric barrier material as shown in FIGS. 1-6 may have a typical thickness of from 3 to 30 mils. The interlocking in the embedded portion 13 creates a strong cohesive bond that does not pull apart.

To prevent a slippery surface, the embedded polymeric barrier layer material should not extend through the entire thickness of felt. For example, extruding 5 mils of a polypropylene barrier layer into a 3 oz/yd$^2$ felt may result in bleed through of the barrier layer onto the exposed surface of the felt. Bleed through may also make the composite less tear and abrasion resistant. For example, in an 8 oz/yd$^2$ needlepunch fabric, the barrier layer resin may be embedded 10 to 80 percent into the thickness of the needlepunch, typically from 15 to 50 percent. Since the felt layers 11 and the barrier layers 15 are fused together, slippage between the layers is avoided and the composite is safer to walk on. Additionally, the composite can be treated on site, e.g., with brine solutions to prevent the formation of slippery ice during cold weather and, since there are no voids between the barrier layer and the felt, the brine stays on the felt layer where it is most effective.

In accordance with the present invention, the resin of the barrier layer may be matched to a resin contained in the felt. The matched resins do not require tie layers to achieve adequate bond, which eliminates weak adhesion transition zones that can lead to delamination. Furthermore, the matched resins provide similar resin types for recycling purposes. For example, gas drilling pad liners are installed for short durations, typically one week to one year. Without a means of recycling the large covered area, significant amounts of liner are disposed of in landfills. Needlepunched polypropylene felt provides good chemical and puncture resistance in a recyclable resin. By using polypropylene-based resins in the barrier layer, the composite can be pressure washed or elutriated to remove dirt and grime, and then recycled in its entirety as polypropylene. Current liners that use dissimilar resin types in the geomembrane and the geotextile need to have the layers physically separated as not to contaminate the recycle streams. Also, lighter barrier films (e.g., 10 mils) used in accordance with embodiments of the present invention produce less material to landfill if the material is not recycled.

The polymeric barrier layers 15 may include modified resins in portions of the layers that may not significantly impact recyclability but may improve overall performance. For example, rubber modified resins, such as rubberized thermoplastic olefin (r-TPO) and impact-copolymer polypropylene, may be added to the polymeric barrier layer to provide improved cold crack resistance over straight polypropylene resins. In one embodiment, such resins are not provided on the top surface of the polymeric barrier layer due to decreased chemical resistance to hydrocarbons, such as gasoline and diesel fuel.

In certain embodiments of the invention, the composite containment liners are capable of being seamed together in the field to cover relatively large areas. Otherwise, a single sheet of material would be extremely heavy to position, especially when wet. For example, non-conventional drilling sites utilizing a fracturing step tend to range in size from 150×150 feet to over 400×400 feet. The containment liners may also be pieced and seamed together around well bore cellars and other structures.

Typical seam sealing techniques include hot air and hot wedge lamination. Since thermally welded felt-to-felt seams are not liquid tight without using a sealant, or without using an extremely slow wedge welding speed, the composite containment liners may be seamed by fusing together the embedded polymeric barrier film layers 15 on adjacent sections. A composite containment liner with an embedded polymeric barrier layer exposed on the top side 20 of one longitudinal edge and on the bottom side 20 of the opposite edge may be used. Thus, side-by-side sections of the composite containment liners can be seamed together using, e.g., a half lap joint to form a liquid-tight seal that has minimal raised or loose edges. Low-profile seams mitigate tripping, and reduce the probability of the seam being snagged and pulled open by traffic and equipment movement.

Thermal seam sealing equipment typically has a sealing or fission width of 1.5 to 3 inches. Narrow offsets provide for very little room for error during the seaming process. Conversely on wide offsets, if the seaming process is not carried out close to the exposed edge of the offset, it can result in an unfused flap that can be caught by moving equipment. The offset distance D may be from 1 to 6 inches, typically from 2 to 3 inches.

The containment liners of the present invention may be made by extrusion processes that embed the polymeric barrier layers 15 into the felt layers 11. An embodiment of the present invention provides a two extrusion die process, such a tandem coating line or a two-pass operation. The dies can provide monolayer or coextruded films. If a coextrusion die is used, a modified resin may be used in the center layer. Alternatively, the composite may be made in a single pass with a single die. However, by extruding a polymeric barrier layer into each felt layer separately, it is unlikely that any pinholes in one layer would align with any pinholes in other layers through the composite. In an alternative embodiment, an additional separate film can also be thermally fused to the embedded polymeric barrier layer in an extrusion nip. This film can contain the modified resins. It may also contain tints or pigments to designate which side of the composite contains the additional film.

The combined felt layer and embedded polymeric barrier layer, with or without a thermally fused film that matches the width, can be laminated together with offsets in a number of ways. For example, the low-heat set side of a first felt layer can be coated with a first polymeric barrier layer in an extrusion nip. The coated material then passes into a second extrusion nip where the low-heat set side of a second felt layer of approximately the same width is also coated with a second polymeric barrier layer. The two coated felts may be offset from each other by 1 to 12 inches and, with the polymeric barrier layers facing each other, may be pressed together while the second extruded barrier layer is still molten. In another embodiment, the polymeric barrier layers may be embedded into the felts in separate operations and then joined together in an extrusion nip or by heating the embedded film surfaces and pressing together. Finished roll edges may be trimmed to 1 to 6 inch offset width, preferably 2 to 3 inch for ease of seaming in the field.

If a separate heat fused intermediate layer is incorporated, it may be limited to the width of the felt in the first extruder of a tandem line or in the first step of the two-pass operation. Extending this film past the felt to provide an offset for the second extruder to cast upon may result in poor adhesion of the separate heat fused film to the second embedded barrier film of the second felt layer in this offset area. This is due to the reduced thickness of the offset, which results in a low pressure area in the nip rollers. Since heat, pressure and dwell time are critical to fuse the layers together without adhesive, such a low-pressure area can result in unwanted delamination in the field. A separate film may thus be limited to one of the sealing offsets unless a contoured nip system is used.

Figure 8:
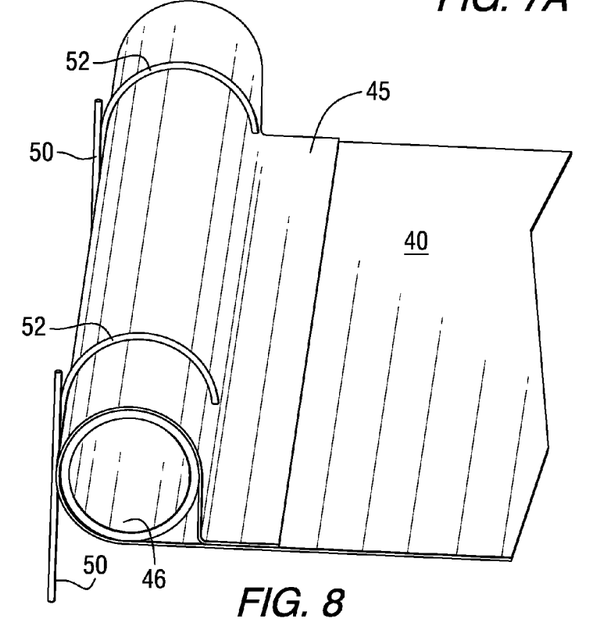
FIG. 8 illustrates a section of a containment liner and berm in accordance with an embodiment of the present invention.

FIG. 8 illustrates a section of a containment liner 40 wrapped around a pipe 46 to form a berm. An edge 45 of the containment liner is secured to the remainder of the containment liner 40 by any suitable method such as heat bonding. The pipe 46 may be smooth or corrugated, or could be replaced with a solid material such as a railroad tie or a plastic barrier. Stakes 50 including upper hooks 52 may be used to keep the berm from shifting. The upper portion of each stake 50 provides an area to drive the stake 50 into the ground, e.g., by a hammer drill.

Figure 9:
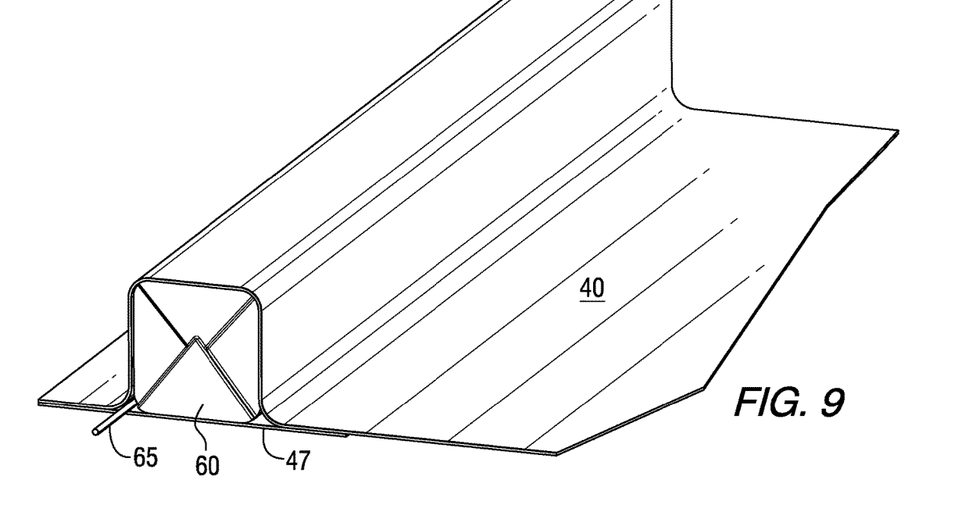
FIG. 9 is illustrates a section of a containmnent liner and berm in accordance with another embodiment of the present invention.

FIG. 9 illustrates a section of a containment liner 40 including a berm 60 wrapped in the composite liner 40. An additional strip of liner material 47 may optionally be positioned below the berm 60 and may be bonded to the underside of the containment liner 40 by any suitable means such as heat bonding. An optional tethering rod or rope 65 extending along the length of the berm 60 may be used to stake the berm into the ground to prevent movement thereof In the embodiment shown, the berm 60 has a rectangular cross section, however, any other suitable shape such as triangular or crowned may be used. The berm 60 may be made of solid or hollow material such as plastic, foam, wood or the like.

Figure 10:
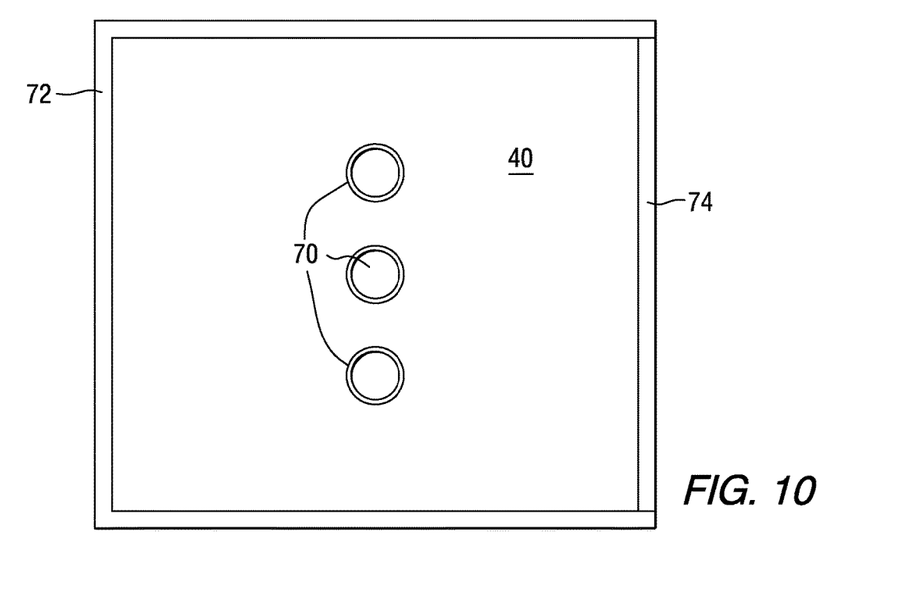
FIG. 10 is a partially schematic plan view of a containment liner comprising side berms and central openings or cellars to accommodate drilling equipment in accordance with an embodiment of the present invention.

FIG. 10 illustrates a containment liner 40 comprising side berms 72 and 74, and central openings or cellars 70 configured to accommodate drilling equipment in accordance with an embodiment of the present invention. The berms 72 and 74 may be of similar or different construction. For example, the side berm 72 may be relatively hard, while the side berm 74 may be relatively soft or elastic to enable vehicular traffic or other equipment to enter onto the containment liner 40.

Figure 11:
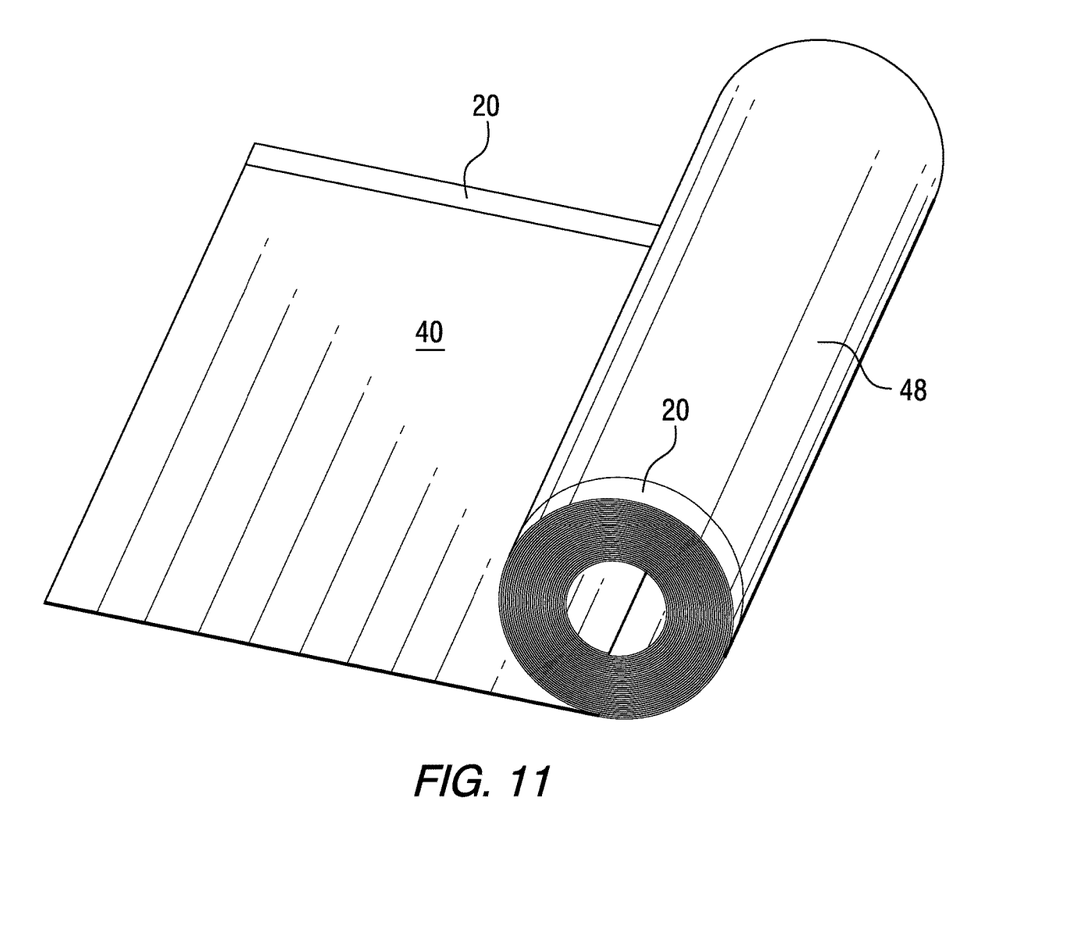
FIG. 11 is a partially schematic isometric view of a roll of containment liner sheet material in accordance with an embodiment of the present invention.

FIG. 11 illustrates a roll 48 of containment liner sheet material 40 in accordance with an embodiment of the present invention. The containment liner 40 includes offset edges 20 for sealing adjacent liner sections together, as described above. In accordance with embodiments of the present invention, the roll 48 may be used to install multiple sections of the containment liner 40 over a desired area. A desired length of the containment liner 40 may be rolled out across a portion of the site and cut to length. Then the same roll 48, or a different roll, may be used to roll out another section of the containment liner 40 next to the first section, and so on until the entire area is covered. The adjacent sections of containment liner 40 may then be sealed together, as described above.

Figure 12:
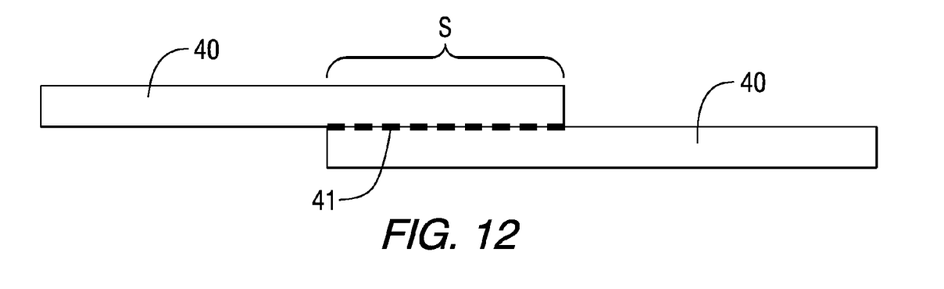
FIG. 12 is a partially schematic side view illustrating a seam between adjacent containment liner sections in accordance with an embodiment of the present invention.
Figure 13:
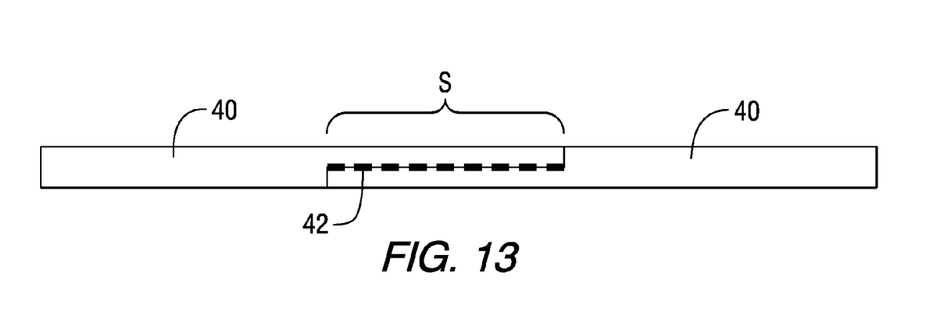
FIG. 13 is a partially schematic side view illustrating a seam between adjacent containment liner sections in accordance with another embodiment of the present invention.
Figure 14:
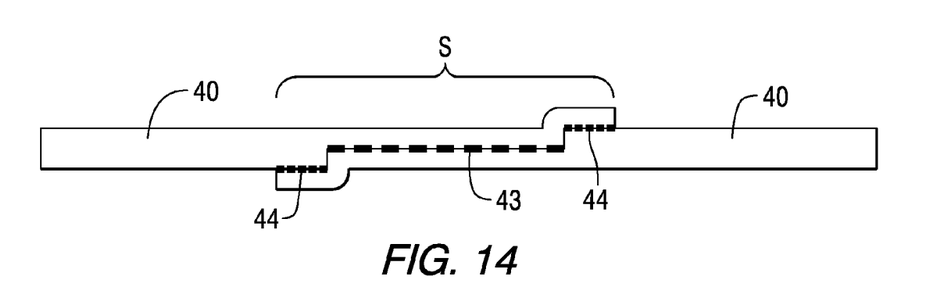
FIG. 14 is a partially schematic side view illustrating a seam between adjacent containment liner sections in accordance with a further embodiment of the present invention.

FIGS. 12-14 illustrate embodiments of various joints for sealing adjacent sections of containment liners 40 together. In FIG. 12, the seal S comprises a full lap joint 41 between the lower surface of one containment liner section 40 and the upper surface of another containment liner section 40. In FIG. 13, the seal S comprises a half lap joint 42 that provides a low profile. The edges of the containment liner sections 40 have offsets similar to those illustrated in FIGS. 1-6 which fit together to provide a half lap joint 42. In FIG. 14, the seal S is similar to the half lap joint illustrated in FIG. 13, however, in addition to a central half lap joint 43, the seal S of FIG. 14 includes side joints 44 that provide additional seam strength. Such a modified half lap joint 43, 44 minimizes the joint height and increases seam flexibility as compared to a full lap joint as shown in FIG. 12, while increasing seam strength as compared to a half lap joint as shown in FIG. 13. The modified half lap joint 43, 44 may have about 0.25 to 0.5 inch of the sealing offset 44 extending beyond the typical sealing area 43 of a half lap joint. It extends onto the outer surface of the liner where it is bonded to create a stronger seam. The extended portion 44 of the modified half lap joint may be present on one or both surfaces of the liner. If present on both surfaces, it may be optional to bond only one of the extended portions to the felt.

The following example illustrates various aspects of the present invention, and is not intended to limit the scope of the invention.

EXAMPLE

Three variations of containment liners were made with varying thicknesses of polymeric barrier layers of 10 mil, 20 mil and 30 mil. A layer of needlepunched polypropylene felt having a density of 8 oz/yd$^2$ was coated with HDPE using an extruder having multiple die holes through which the molten HDPE passed. After the extruded HDPE was applied to the surface of the felt, another layer of similar needlepunched polypropylene felt was placed on the molten HDPE coating and the layers were passed through a chilled roll nip. Testing was conducted in accordance with the standardized ASTM test procedures listed in Table 1 below. The measured physical properties are shown in Table 1.

TABLE 1

Containment Liner Physical Properties

| Polymeric Barrier Layer Thickness (mil) | Tensile Properties (Max Strength) ASTM D 6693/GRI, 2 ipm rate, (ppi), (%) | | Average Puncture Resistance ASTM D 4833 (lbs) | Average Tear Resistance ASTM D 1004 (lbs) |
|---|---|---|---|---|
| | Average Break | Average Elongation | | |
| 10 | 85.5 | 20.0 | 192 | 47.5 |
| 20 | 90.0 | 15.5 | 182 | 42.5 |
| 30 | 85.5 | 19.5 | 192 | 48.5 |

The differences in the measured physical properties of the three constructions having different polymeric barrier layer thicknesses were not significant.

Whereas particular embodiments of this invention have been described above for purposes of illustration, it will be evident to those skilled in the art that numerous variations of the details of the present invention may be made without departing from the invention.

The invention claimed is:

1. A containment liner comprising:
   a first felt geotextile layer comprising polypropylene fibers, polyester fibers, or a combination thereof;
   a second felt geotextile layer comprising polypropylene fibers, polyester fibers, or a combination thereof covering at least a portion of the first felt geotextile layer;
   a first liquid impermeable polymeric barrier layer between the first and second felt geotextile layers partially embedded into the first felt geotextile layer, wherein the first partially embedded polymeric barrier layer extends into the first felt geotextile layer at least 5 percent of a thickness of the first felt geotextile layer and a distance of from 3 to 30 mil;
   a second polymeric barrier layer embedded in the second felt geotextile layer; and
   an intermediate layer comprising a continuous, liquid impermeable polymeric layer between the first and second polymeric barrier layers.

2. The containment liner of claim 1, wherein the first partially embedded polymeric barrier layer extends into the first felt geotextile layer from 10 to 80 percent of the thickness of the first felt geotextile layer.

3. The containment liner of claim 1, wherein the first partially embedded polymeric barrier layer extends into the first felt geotextile layer from 15 to 50 percent of the thickness of the first felt geotextile layer.

4. The containment liner of claim 1, wherein at least one of the first and second felt geotextile layers comprises a heat treated surface.

5. The containment liner of claim 1, wherein the first and second felt geotextile layers comprise heat treated outer surfaces.

6. The containment liner of claim 1, wherein the first and second felt geotextile layers further comprise fibers selected from wool, hemp, coconut, jute, nylon, rayon, polytetrafluoroethylene, aromatic polyimide aramid, poly para-phenyleneterephthalamide or a combination thereof.

7. The containment liner of claim 6, wherein the fibers are nonwoven.

8. The containment liner of claim 6, wherein the fibers are woven.

9. The containment liner of claim 1, wherein the first and second felt geotextile layers comprise needlepunched polypropylene or woven reinforced needlepunched polypropylene.

10. The containment liner of claim 1, wherein the first and second felt geotextile layers have thicknesses of from 25 to 500 mil.

11. The containment liner of claim 10, wherein the thicknesses of the first and second felt geotextile layers are the same.

12. The containment liner of claim 10, wherein the thicknesses of the first and second felt geotextile layers are different.

13. The containment liner of claim 1, wherein the first partially embedded polymeric barrier layer is extruded.

14. The containment liner of claim 1, wherein the first partially embedded polymeric barrier layer comprises polypropylene, thermoplastic olefin, linear low-density polyethylene, low-density polyethylene, medium-density polyethylene, high-density polyethylene, polyethylene terephthalate, polybutylene terephthalate, polyvinyl chloride (PVC), nylon, polystyrene, polyurethane, ethylene vinyl acetate, styrene block copolymers or a combination thereof.

15. The containment liner of claim 1, wherein the first partially embedded polymeric barrier layer comprises polypropylene, polyethylene, thermoplastic olefins or a combination thereof.

16. The containment liner of claim 1, wherein a non-embedded portion of the first partially embedded polymeric barrier layer has a thickness of from 2 to 60 mils.

17. The containment liner of Claim 1, wherein the intermediate layer comprises polypropylene, thermoplastic olefin, linear low-density polyethylene, low-density polyethylene, medium-density polyethylene, high-density polyethylene, polyethylene terephthalate, polybutylene terephthalate, polyvinyl chloride (PVC), nylon, polystyrene, polyurethane, ethylene vinyl acetate, styrene block copolymers or a combination thereof.

18. The containment liner of claim 1, wherein the intermediate layer comprises multiple polymeric layers.

19. The containment liner of claim 1, wherein the intermediate layer comprises reinforcements selected from the group consisting of fibers, strings, scrim cloth and combinations thereof.

20. The containment liner of claim 1, further comprising another containment liner section having an edge sealed to an edge of the containment liner.

21. The containment liner of claim 20, wherein the edges are sealed by a half lap joint.

22. The containment liner of claim 1, further comprising a berm surrounding at least a portion of the containment liner.

23. The containment liner of claim 1, wherein the containment liner has an average tear resistance of at least 42.5 lbs.

24. The containment liner of claim 1, wherein the containment liner has an average break tensile strength of at least 85.5 ppi.

25. The containment liner of claim 1, wherein the containment liner has an average puncture resistance of at least 182 lbs.

* * * * *